J. JENNINGS.
Spectacles.
No. 38,262.
Patented April 21, 1863.
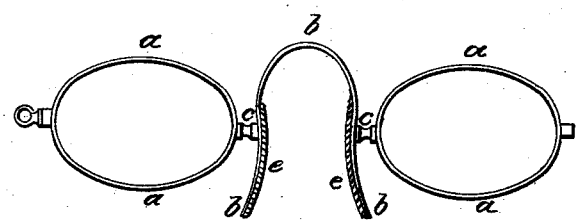
Witnesses:
P. E. Wilson
Edward Evans Jr.
Inventor:
John Jennings
By atty. A. B. Stoughton

UNITED STATES PATENT OFFICE.

JOHN JENNINGS, OF BIRMINGHAM, ENGLAND, ASSIGNOR TO S. & J. MYERS, OF BOSTON, MASSACHUSETTS.

IMPROVEMENT IN SPECTACLES.

Specification forming part of Letters Patent No. 38,262, dated April 21, 1863.

*To all whom it may concern:*

Be it known that I, JOHN JENNINGS, of Birmingham, England, have made certain new and useful Improvements in Spectacles and Eyeglasses; and I do hereby declare the following to be a full, clear, and exact description of the same, reference being had to the accompanying drawing, representing the same, and making a part of this specification.

I am aware that in eyeglasses the frames have been connected by a spring, which spring tends to hold the glasses in position; but the spring has heretofore been so connected to the frames for holding the glass as to throw the glasses out of the true or direct line of vision, and thus make them objectionable.

My invention consists in so connecting the bow spring to the glass-frames as that it will hold the spectacles firmly in place, but, in yielding to the extent that the glasses must do, shall not be thrown out of the line of the center of vision, as will be hereinafter explained.

To enable others skilled in the art to make and use my invention, I will proceed to describe the same with reference to the drawing.

The frames that contain the lenses may be round or oval, as shown at $a\ a$. They are attached by means of arms $c\ c$ to an inverted bow or U-shaped spring, $b$, said arms $c\ c$ being in or near the line of the horizontal diameters of the glasses or lenses. Where the arms $c\ c$ are united to the spring, the sides of the spring may curve somewhat toward each other, and then from each other at their ends, to fit and easily rest upon the nose of the user. The spring is in nearly a harp shape, and the portions of it which rest upon the nose, may be padded as at $e$, to prevent it from unpleasant pressure thereon.

One of the objects aimed at in this construction of spectacles and eyeglasses is to avoid the use of the side bars, and make the instrument strong, compact, and cheap; but the main object is to prevent the centers of the lenses or glasses from being forced out of the center of the line of vision when they are sprung apart sufficient to allow the bow or spring to be placed over the nose, a greater portion of the yielding for this purpose being taken up by the portions of the spring extending beyond the point where it is connected to the arms $c\ c$, and a smaller portion taken up by the incurving of the sides of the bow toward each other at that point.

Having thus fully described my invention, what I claim in the construction of spectacles and eyeglasses made without side bars is—

The spring harp-shaped bow $b$, when united to the lens-frames $a\ a$, as shown, to make them self-supporting, and when so united as to admit of being spread without much deviation from the center of vision, as herein represented.

JOHN JENNINGS.

Witnesses:
J. M. G. UNDERHILL,
JAMES H. ROUS.